United States Patent
Demaj et al.

(10) Patent No.: US 9,020,541 B2
(45) Date of Patent: Apr. 28, 2015

(54) PROCESS AND RECEIVER FOR RECOVERING PAGING MESSAGE

(75) Inventors: Pierre Demaj, Nice (FR); Fabrizio Tomatis, Saint Laurent du Var (FR); Martial Gander, Les Arcs sur Argens (FR)

(73) Assignee: St-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/578,640

(22) PCT Filed: Feb. 28, 2011

(86) PCT No.: PCT/EP2011/000970
§ 371 (c)(1),
(2), (4) Date: Aug. 13, 2012

(87) PCT Pub. No.: WO2011/107245
PCT Pub. Date: Sep. 9, 2011

(65) Prior Publication Data
US 2012/0309435 A1 Dec. 6, 2012

Related U.S. Application Data

(60) Provisional application No. 61/408,260, filed on Oct. 29, 2010.

(30) Foreign Application Priority Data

Mar. 1, 2010 (EP) .................................... 10368017
Oct. 15, 2010 (EP) .................................... 10368039

(51) Int. Cl.
*H04W 68/00* (2009.01)
*H04W 68/02* (2009.01)

(52) U.S. Cl.
CPC .................................... *H04W 68/02* (2013.01)

(58) Field of Classification Search
CPC .............................. H04W 68/00; H04W 68/02
USPC .......................... 455/458; 370/312; 711/209
See application file for complete search history.

(56) References Cited

U.S. PATENT DOCUMENTS

2006/0089161 A1* 4/2006 Kim et al. ................. 455/458
2008/0287134 A1* 11/2008 Catovic et al. ............. 455/445

(Continued)

FOREIGN PATENT DOCUMENTS

EP 2 046 068 A1 4/2009
WO 2006/138625 A2 12/2006

OTHER PUBLICATIONS

ETSI, "Universal Mobile Telecommunications System (UMTS); Physical layer procedure (TDD) (3GPP TS 25.224 version 9.1.0. Release 9)", Technical Specification, European Telecommunications Standards Institute (ETSI), 650, Route Des Lucioles; F-06921 Sophia-Antipolis; France, vol. 3GPP RAN 1, No. V9.1.0, Mar. 1, 2010, XP014046550.
International Preliminary Report on Patentability and Written Opinion issued in corresponding International application No. PCT/EP2011/000970 on Sep. 4, 2012.
International Search Report issued in corresponding International application No. PCT/EP2011/000970, mailing date Jul. 8, 2011.

(Continued)

*Primary Examiner* — Christopher M Brandt
*Assistant Examiner* — Joseph Dean, Jr.
(74) *Attorney, Agent, or Firm* — Patent Portfolio Builders PLLC

(57) ABSTRACT

A method of processing a paging message, the method being suitable for a User Equipment (UE) for a wireless telecommunication system, and comprising the steps of:—monitoring a Paging Indicator (PI) included in a Paging Indicator Channel (PICH) message;—upon reception (210) of a Paging Indicator (PI) relevant to said User Equipment, detecting and decoding a paging (PCH) channel in order to decode a corresponding paging message (220);—computing and checking the CRC (230) of said paging message and, in case of failure of the CRC check, performing the following steps:—performing (240, 250) a partial checking of said paging message, said partial checking being limited to a number of fields of said paging message;—determining whether said paging message is relevant to one single UE (260);—if said paging message is relevant to one single UE, replacing (261) the bits not relevant to said single UE by default bits and computing and checking (262) a new CRC—if the new CRC check succeeds, forwarding the processed paging message to the Radio Resources Control (RRC) layer.

15 Claims, 2 Drawing Sheets

(56) References Cited

U.S. PATENT DOCUMENTS

| | | | |
|---|---|---|---|
| 2008/0311947 A1* | 12/2008 | Soerensen et al. | 455/522 |
| 2009/0181700 A1* | 7/2009 | Willey et al. | 455/458 |
| 2010/0227569 A1* | 9/2010 | Bala et al. | 455/73 |
| 2011/0092229 A1* | 4/2011 | Chang et al. | 455/458 |

OTHER PUBLICATIONS

Written Opinion of the International Searching Authority issued in corresponding International application No. PCT/EP2011/000970, mailing date Jul. 8, 2011.

* cited by examiner

PROCESS AND RECEIVER FOR RECOVERING PAGING MESSAGE

TECHNICAL FIELD

The invention relates to the field of wireless communications and more particularly to an improved process for processing and recovering paging messages received by a User Equipment (UE)

BACKGROUND

Paging is a technique which is widely used in most wireless telecommunications and, generally speaking, paging and notification is the first step being involved in a mobile-terminated voice call setup between a Node B and a User Equipment (UE) in the context of a third generation (3G) of cellular communication standard, as defined by the 3GPP ($3^{rd}$ Generation Partnership Project).

Taking the 3GPP standard as an example, there are two types of paging—PagingType1 and PagingType2—which are used in different situations. The first type is used when the UE is in a idle mode—for saving battery life—to establish an Radio Resource Control RRC (ie layer 2 of the OSI model) connection to deliver a call.

In an Idle mode, the UE regularly monitors—in the so-called Discontinous Reception DRX cycle—whether it is receiving a call. Each time the UE is active in the DRX cycle, a Paging Information Channel (PICH) is monitored. In case the information received on the PICH is positive, i.e., indicates an incoming call for the UE, this is followed by a monitoring of a Secondary Common Control Physical Channel (SCCPCH) carrying a Paging Channel PCH. This paging procedure is used to signal to UE that there is an incoming call. A multipath detection may need to be performed each time the user equipment becomes active in the DRX cycle.

The paging procedure allows signaling from a network to a UE or to a plurality of UEs. More particularly, the PICH channel allows the notification of a short paging indicator (PI) to a UE and the latter, once notified, has to decode the corresponding Paging Channel (PCH) corresponding to the PI previously received.

The following patents are examples of processes in the art.

US2009129343 describes an incoming data detection method for handling unsuccessful reception of PCH messages. In this case it is proposed that the mobile terminal will have to make a cell re-selection decision itself if the PICH indicates a system information and the terminal fails to receive the PCH, ie CRC-NG.

U.S. Pat. No. 5,930,706 method and apparatus for detecting data contained in transmitted messages (e.g. page messages) at a selected early point in the receiving and decoding process. By forming, at that point, a received data vector (RDV) from the data corresponding to a received message, and by comparing the RDV with one or more test data vectors (TDVs) representing selected relevant or irrelevant data contained in transmitted message, the receiver can determine whether the received message contains relevant data which should be fully decoded or irrelevant data which does not need to be decoded.

Clearly, the decoding of the PI signal is particularly critical for the reasons below:

Firstly, the PI is the first signal generated by the Node B in relation to a mobile-terminated call setup with a UE and its decoding within the PICH channel has to be achieved by the UE with minimum knowledge of the channel and also without taking advantage of the error correction mechanism existing in the channel decoder.

Secondly, the need to minimize battery consumption prevents the possibility of providing the UE with a significant duration for activating its RF circuits for the purpose of sensing the PI signal and thus detecting the latter in the best conditions Thirdly, the PI is transmitted by the base station with a predefined transmission power which is accurately set by the operators so as to achieve a limited amount of interference possibly affecting neighboring cells.

When a UE is not capable of decoding the Paging Indicator, the base station might have to regenerate it to get the appropriate response from the UE.

Generally speaking, the network operators typically set the power level of the transmission of the PCH channel so as to lead to a failure rate in between 0 and 30% in accordance with the radio conditions.

It results from the observations above that the PI detection is a highly critical operation which affects not only power consumption of the UE (RF circuits using a significant amount of current) but also the efficiency of the RF receiver, as perceived by the operators and the customers. The paging signal typically lasts only a few micro seconds and if the UE does not detect such signal, the base station would then need to retransmit the same paging signal.

Therefore, there is a desire for enhanced processes and receivers which improve the handling of the PI received from the base station.

SUMMARY OF THE INVENTION

It is an object of the present invention to obviate at least some of the disadvantages of the prior art.

Some embodiments of the invention reduce the failure rate of the paging decoding in a mobile communication terminal while maintaining at a low level power consumption.

Some embodiments of the invention provide an improved decoding process of the paging for a UMTS mobile communication terminal.

Some embodiments of the invention provide an enhanced user equipment UE which has improved detection of both the PICH and PCH channels.

Some embodiments of the invention decrease the PCH decoding failure rate.

In a first aspect of the invention, these and other objects may be achieved by means of a method of processing a paging message, the method being suitable for a User Equipment (UE) for a wireless telecommunication system, and comprising the steps of:

monitoring a Paging Indicator (PI) included in a Paging Indicator Channel (PICH) message;

upon reception of a Paging Indicator (PI) relevant to said User Equipment, detecting and decoding a paging (PCH) channel in order to decode a corresponding paging message;

computing and checking the CRC of said paging message.

When the CRC shows to be uncorrect, the process further involves the steps of:

performing a partial checking of said paging message, said partial checking being limited to a number of fields of said paging message;

determining whether said paging message is relevant to one single UE;

if said paging message is relevant to one single UE, replacing the bits not relevant to said single UE by default bits and computing and checking a new CRC if the new CRC check succeeds, forwarding the processed paging message to the Radio Resources Control (RRC) layer.

Such a process may achieve the recovery of a significant amount of paging messages, particularly when only one UE is identified in the message. In some scenarios, this results from the fact that, when the UE reaches the cell boundaries, the corruption of the paging message is only partial and that message can be recovered, particularly when only one UE is being considered and identified in the message.

In some embodiments, the partial checking comprises the checking of the header of the paging message and more particularly the checking of one or more of the following fields of the paging message:
   "Paging type 1=0" (1 bit),
   "Paging Record List present=1" (1 bit),
   "cn-Identity=0" (1 bit),
   "Number of paging record=000 or 001 or 010",
   "laterNonCriticalExtensions=0")

According to some embodiments, the process comprises the checking of the presence of data on the broadcast (BCH) information.

In some embodiments, the paging message is discarded in the case of no broadcast information.

Alternatively, the paging message is discarded in the case where said paging message is relevant to a number of UEs superior to 1.

In one embodiment, a Paging header is being checked when the paging message is relevant to a number of UEs superior to 1.

In one embodiment, the process includes the step of replacing the bits not relevant to said single UE by default bits in the case where the paging header is correct.

A second aspect of the invention is a receiver of a User equipment adapted to process a paging message in a User Equipment (UE) of a wireless telecommunication system. The receiver includes:
a monitor adapted to monitor a Paging Indicator (PI) included in a Paging Indicator Channel (PICH) message;
a detector and a decoder, respectively adapted to detect and decode the PCH channel in order to decode a corresponding paging message upon reception of a Paging Indicator (PI) relevant to said User Equipment;
a processor adapted to compute and check the CRC (230) of said paging message.

The receiver is characterized by the fact that it further includes:
a processor adapted to perform (240, 250) a partial checking of said paging message in case of failure of the CRC check, said partial checking being limited to a number of fields of said paging message;
a determination unit adapted to determine whether said paging message is relevant to one single UE (260);
a processor adapted to replace (261) the bits not relevant to said single UE by default bits and compute and check (262) a new CRC, if said paging message is relevant to one single UE,
means for forwarding the processed paging message to the Radio Resources Control (RRC) layer if the CRC check succeeds.

According to some embodiments, the processor is adapted to perform a partial checking is adapted to perform a checking of a header of the paging message.

In one embodiment the partial checking is performed on one or more of the following fields of the paging message:
   "Paging type 1=0" (1 bit),
   "Paging Record List present=1" (1 bit),
   "cn-Identity=0" (1 bit),
   "Number of paging record=000 or 001 or 010",
   "laterNonCriticalExtensions=0"), A third aspect of the invention is a wireless communication device comprising a receiver according to the second aspect. In some embodiments, the wireless communication device may be a UMTS mobile telephone of the $3^{rd}$ generation.

DESCRIPTION OF THE DRAWINGS

Other features of one or more embodiments of the invention will best be understood by reference to the following detailed description when read in conjunction with the accompanying drawings.

DESCRIPTION OF EMBODIMENTS

Embodiments of the invention will now be described that may improve the decoding of the paging message so as to reduce the failure rate. Some embodiments may be particularly useful when the mobile terminal reaches the boundaries of the cell and tends to experience the lowest RF signal from its serving base station.

Embodiments of the invention are particularly suitable for the so-called UMTS (Universal Mobile Telecommunication System) standard, as defined by the 3GPP ($3^{rd}$ Generation Partnership Project), but could, for example, also be embodied in any subsequent version of the standard.

Figure 1:
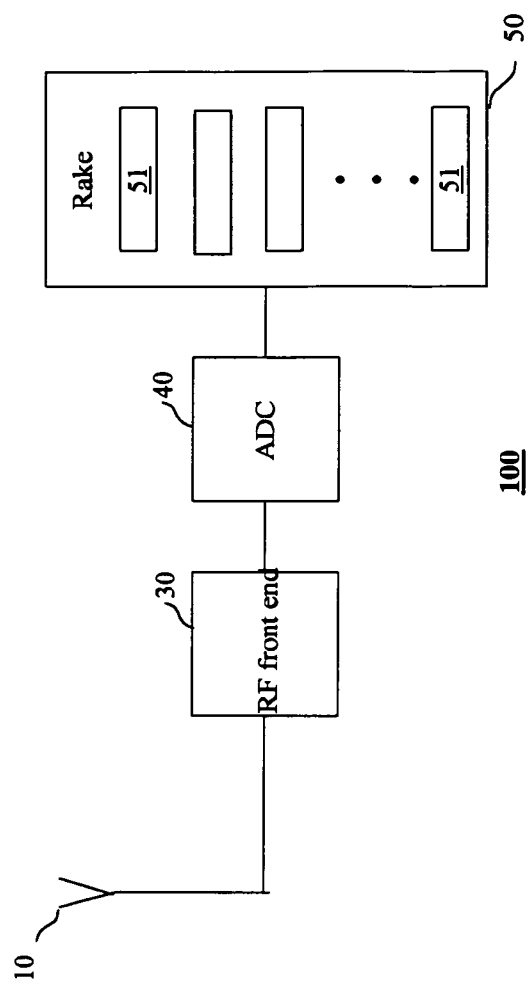
FIG. 1 illustrates a UE arranged to perform a process according to some embodiments of the present invention.

The process which is hereinafter described may be embodied within a receiver such as the receiver illustrated in FIG. 1. The receiver includes a channel decoder, as illustrated in FIG. 1, which may be based on any conventional Rake receiver. More particularly the embodiment comprises an RF receiver which comprises any conventional Rake receiver for the purpose of coherently combining the signal energy received on different multipaths. As known by the skilled man, using a Rake receiver, a separate correlator receiver, also referred to as "Rake finger" or "finger", can be assigned to each detected multipath. The outputs of the fingers are compensated for delay and phase, and combined into one detected signal. Correctly identifying a multipath profile thus improves the performance of a UE, since a larger number of compensated multipath signals delivers more total signal energy of the detected signal to the Rake receiver. The number of fingers used and the delay of each finger in a Rake receiver are allocated on the basis of the operation of a multipath searcher.

While the embodiment which will be described below refers to the use of a rake receiver, it should be clear that the invention may be adapted in any receiver of a wireless communication device suitable for a communication system applying paging may be relevant. E.g. a receiver based on a chip equalizer.

With respect to FIG. 1 again, there is depicted a schematic block diagram of a Rake receiver 100 according to an embodiment. The Rake receiver 100 comprises an antenna section 10, which may comprise one signal antenna or several individual antennas. The antenna(s) are then connected a radio-frequency (RF) front end module 30, itself followed by an analog-to-digital converter (ADC) 40 generating a digital representation of the received RF signal.

While the embodiment which will be described below refers to the use of a rake receiver, it should be clear that the invention may be adapted in any receiver of a wireless communication device suitable for a communication system applying paging may be relevant. E.g. a receiver based on a chip equalizer.

Coming again to FIG. 1, the output of ADC 40 is fed to a Rake unit 50 which is represented as including a set of N Rake fingers 51, each performing a parallel processing of the incoming signal. The output of the individual Rake fingers is then forwarded to any conventional digital processing unit which, for the sake of clarity, has not been represented.

Generally speaking, the concept of a Rake receiver is well known to a skilled man and does not need any further description. It suffices to recall that channel decoding includes rate matching, Viterbi and de-interleaving mechanism.

Once decoded at the physical layer, the paging message is split into several interpretable elements by means of a ASN1 decoder, which processes the paging message before forwarding it to the Radio Resources Control layer (hereinafter abbreviated "RRC") of the UE. As known by a skilled man, layers of a radio interface protocol between a UE and a network are classified into a first layer (the so-called physical layer), a second layer (the so-called logical layer) and a third layer in accordance with the well known OSI reference model (Open System Interconnection). It is the third layer which constitute the RRC layer enabling the RRC messages to be exchanged between the UE and the network.

As mentioned above, mobile communication operators may arrange the power level of the paging transmission so as to limit the amount of inter-cell interference, thus resulting in a level of PCH decoding failure rate which is approximately between 0 and 30%.

The process which is described below shows some advantageous effect, particularly but not exclusively in a situation where the UE reaches an area corresponding to a cell boundary.

The inventors have observed that when the UE is located near the boundaries of the cell, thus typically resulting in a difficult decoding of the paging message, the PCH blocks are in many situations suffering corruption (e.g. because of the limitation of the transmission power mentioned above), but such corruption has often revealed to be only a partial corruption of the data.

More precisely, it has been discovered that, when the UE reaches the far limit of a cell, the corruption of data typically affects the central part of the block and most often not the head or the tail of the message.

Before being transmitted over the air interface, the data packets are encoded by a conventional channel encoder mechanism. In many cases according to various standards, data before being encoded are appended with '0' value tail bits and '0' value head bits. This makes the head and the tail of the transmitted packet more robust against channel noise.

When the UE is located near the boundary of the cell, i.e. when the RF reception typically experiences a worst case scenario suffering a maximum of interference from neighboring cells, it might occur that PCHs cannot be decoded properly. Thus, transmitted packets suffering from a fading channel may be partially (or fully) corrupted, and processing them using the conventional channel decoding would typically yield a CRC-NG.

Embodiment of the invention involve a mechanism for recovering a significant number of Paging messages which would, in the conventional process, be considered as being unusable. The mechanism has shown to be useful for both fast and slow fading channels.

Generally speaking, the paging channel may be encoded on a transport channel that can support around 200 bits. The paging message can be addressed to a single UE or to several UEs at the same time and the PCH message can occupy those 200 bits transport packets. But only a few bits of that message concern a single UE. In the particular case where the PCH message is only intended for one single UE, '0' is added to fill up the whole PCH message. In the context of the UMTS paging message, only 30% of the message is typically relevant for one particular UE in most cases.

Consequently, and in contrary to the conventional processing which disregard any message which does not show a CRC-ok status, the inventors have devised a process which can re-establish some paging messages even when subject to corruption.

With such a mechanism, a PCH message may be useful even with the occurrence of CRC failure.

There will now be described, with reference to FIG. 2, one embodiment of a process for recovering a paging message, even when suffering CRC failure.

For the sake of clarity, the paging message may typically comply with the following ASN1 structure. For instance a PagingType1 message comprises a message type, an optional paging record list, a number of paging records, and an optional BCCH modification IE.

```
PagingType1 ::= SEQUENCE {
    -- User equipment IEs
    pagingRecordList        PagingRecordList        OPTIONAL,
    -- Other IEs
    bcch-ModificationInfo   BCCH-ModificationInfo   OPTIONAL,
    laterNonCriticalExtensions  SEQUENCE {
        -- Container for additional R99 extensions
        pagingType1-r3-add-ext          BIT STRING OPTIONAL,
        v590NonCriticalExtensions       SEQUENCE {
            pagingType1-v590ext             PagingType1-v590ext-IEs,
            nonCriticalExtensions           SEQUENCE { }
                                            OPTIONAL
        } OPTIONAL
    } OPTIONAL
} OPTIONAL
```

In one illustrative embodiment, the following format can be used, 0x40 referring to the hexadecimal notation:

```
Byte1
0x40 -> 0--- ---- : Paging type 1
0x40 -> -100 ---- : Paging Record List present
0x40 -> ---- 0--- : Choice index select en-Identity =>
No utran-Identity (In IDLE mode only en-Identity is used)
0x40 -> ---- -000 : Number of paging record: 1 (because from 1 to 8)
Byte2
0x01 -> 000- ---- : terminatingConversationalCall
0x01 -> ---0 ---- : CS domain
0x01 -> ---- 000- : IMSI-GSM-MAP
0x01 -> ---- ---1 : IMSI length
Byte3
0x20 -> 001- ---- : IMSI size: 9+6=15 digits in IMSI
0x20 -> ---0 000- : Digit 0: IMSI is starting there
0x20 -> ---- ---0
Byte4
0x02 -> 000- ---- : Digit 1
0x02 -> ---0 001- : Digit 2
0x02 -> ---- ---0
Byte5
0x02 -> 000- ---- : Digit 3
0x02 -> ---0 001- : Digit 4
0x02 -> ---- ---0
Byte6
0x02 -> 000- ---- : Digit 5
0x02 -> ---0 001- : Digit 6
0x02 -> ---- ---0
Byte7
0x46 -> 010- ---- : Digit 7
0x46 -> ---0 011- : Digit 8
...
ByteN
```

The example shown above is only given as an illustrative example. For more details about the structure of Paging messages, and particularly PagingType1 messages. One may refer to existing reference books, and particularly the book:

"*The UMTS air-interface in RF engineering: design and operation of UMTS networks*", by Shing-Fong Su, McGraw Hill.

In the example being considered, there are about 30 bytes in the PCH message. In case the paging message addresses only one UE, the first part of the message is built around 10 bytes. The other 20 bytes will be set to '0' bit value if no optional BCH information is inserted in.

Figure 2:
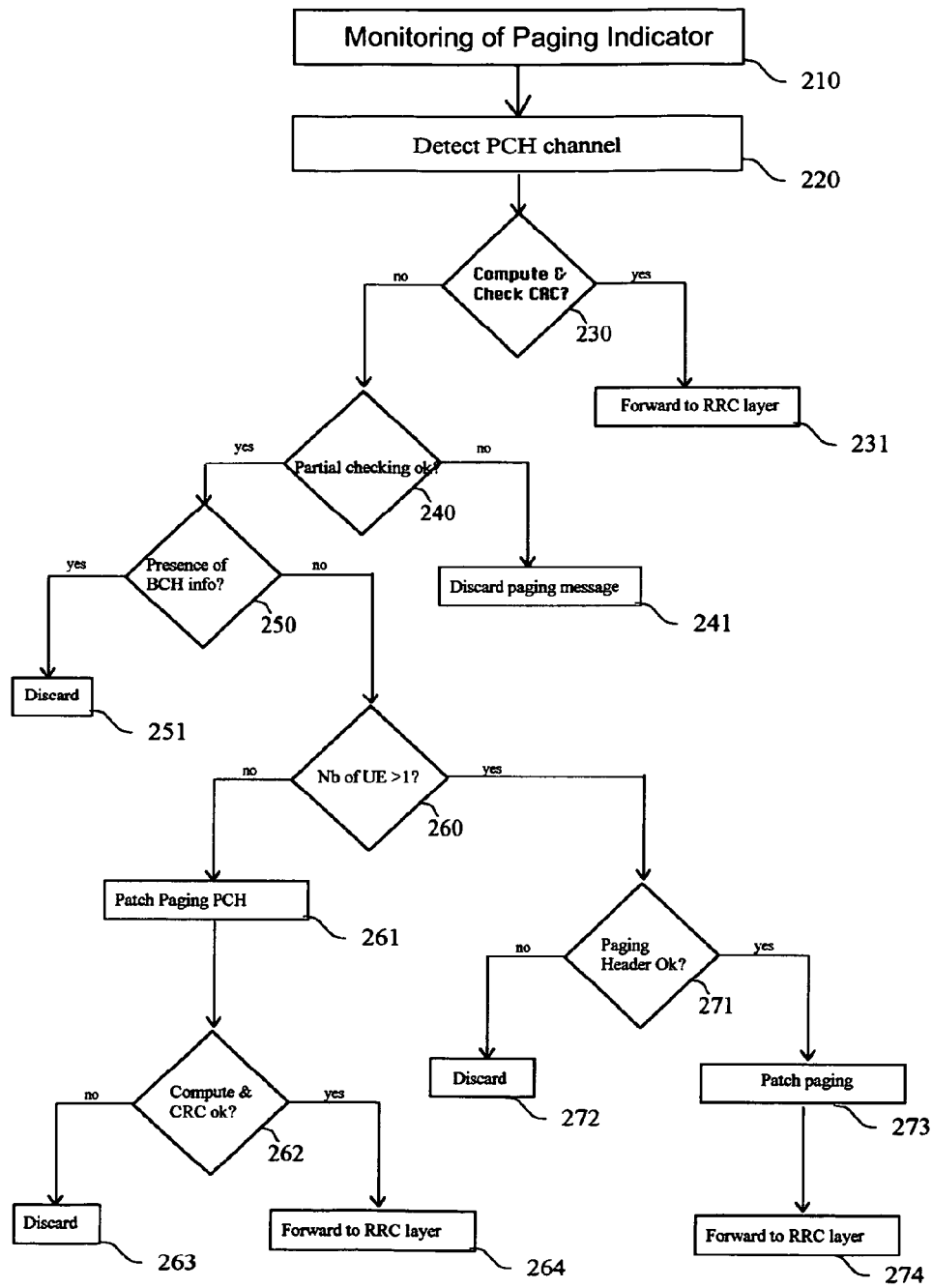
FIG. 2 illustrates one embodiment of a process for processing a paging message.

Referring now to FIG. 2, there is now discussed one embodiment of a process for processing the paging message. For the sake of clarity, the embodiment will be discussed in the Paging Discontinuous Reception (DRX) cycle by which the UE can prolong the battery life when it is in idle mode. In idle mode, a DRX cycle is defined for each core network and correspondingly, paging occasion and a paging indicator are defined for each UE to determine at which occasion the UE must monitor a paging indicator within a DRX cycle. A DRX cycle is the time interval between paging occasions of a UE.

Clearly, the process can be adapted to decode the Paging message even when not in idle mode (for instance for PagingType 2 message).

In a Step 210 the process starts with a periodical monitoring of the Paging Indicator possibly present on the PICH channel. For that purpose the UE regularly gets out of the idle state so as to monitor the PICH channel at the particular occasion to which it corresponds.

It is assumed that, upon request of the upper layers, the RRC layer of the Node B starts the paging procedure by sending a PageType1 message on the PCH mapped to SCCPCH at an appropriate paging occasion. This message may contain a number of paging records, each corresponding for one individual UE. The associated Paging Indicator (PI) is also set on the PICH, and such Paging Indicator (PI) is thus detected in step 210.

After detection of the PI on the PICH channel, the UE then proceeds to a step 220 where it performs an attempt to read the paging message on the appropriate frames of the SCCPCH. This is achieved by involving the channel detection (i.e. channel estimation) associated with the PCH channel, which was discussed with reference to FIG. 1.

The process then proceeds to a step 230 where it performs a CRC checking of the paging message in accordance with the conventional error correcting mechanisms.

If the test succeeds, then the process proceeds to step 231 where the paging message is forwarded to the upper RRC layer of the UE for taking appropriate actions as in the conventional procedure.

However, should the CRC checking fails, and this is now a deviation from the conventional procedure, the process proceeds to a further step 240 wherein a partial checking of the integrity of the Paging message is performed on a limited set of subfields included in the message, for example, by verifying at least one or a set of the following fields of the paging messages:

"Paging type 1=0" (1 bit),
"Paging Record List present=1" (1 bit),
"cn-Identity=0" (1 bit),
"Number of paging record=000 or 001 or 010",
"laterNonCriticalExtensions=0"), It should be noticed that, in accordance with the particular embodiments being considered, one may contemplate to use one or more of those partial checking of some fields or subfields of the paging message. Thus such partial checking permits to discard the whole paging message when some specific—and highly important fields of the paging message—are not present.

If the test fails, then the message is discarded in a step 241.

If the partial checking of step 240 succeeds, then the process proceeds with a step 250 where the presence of BCH information is checked and, in case of BCH information being present, the paging message is discarded in a step 251.

However, if no BCH information is present, then the process proceeds to a further test, in a step 260, where the field representative of the number of UE is checked so as to determine the number of UEs to which the considered paging block is relevant.

If the number of UEs is equal to 1, then the process proceeds to a step 261 where the PCH message is rebuilt. In one embodiment the $11^{th}$ to the $30^{th}$ bytes of the PCH block are zeroed (patched to "0x00" pattern).

The process then proceeds to a step test 262 where the CRC is computed and checked. If the CRC shows to be ok, then the rebuilt paging block is forwarded to the upper RRC layer in a step 264. Conversely, should the CRC test fail, then the paging message is definitely discarded in a step 263.

However, if the number of UEs is shown to be superior to 1, in test of step 260, then the process proceeds with the a further step 271.

Different embodiments may be considered.

In one simple embodiment—which is not the one illustrated in FIG. 2—the paging message is discarded.

Alternatively, and this is depicted in FIG. 2, the step 271 is a test to determine if the paging header is correct.

If not, then the paging message is discarded in a step 272.

On the contrary, if the Paging header is correct, then a similar patching as the one performed in step 261 is associated with step 273 so as to build a new paging message which is likely to be correct to at least the considered user equipment, based on the observation that typically only 30% of the bits within the paging message are relevant to the considered User Equipment.

Then, in a step 274, the process proceeds with the forwarding of the patched paging message to the RRC layer of the User Equipment.

It has been shown that the process which was described above leads to the possibility of recovery of a significant amount of corrupted paging messages, based on the observation that, generally speaking when the UE is near the boundary of the cell, the corrupted bits rarely affect the head or the tail of the paging block which can, thus, be partially recovered at least for the considered User Equipment.

In fading VA120 and PB3, measured improvement is between 30% and 50% of total paging loss Embodiments of the invention may reside inside a mobile telecommunication equipment. If the mobile telecommunication equipment has only a limited amount of memory and hardware components for the purpose of detecting the paging message embodiments of the invention may be particularly useful. In such cases, the UE may have reduced time activity dedicated to sensing the RF air interface sniffing specifically for the sake of low power consumption.

Embodiments of the invention can be implemented in digital electronic circuitry, or in computer hardware, firmware, software, or in combinations of them. An apparatus according to embodiments of the invention can be implemented in a computer program product tangibly embodied in a machine-readable storage device for execution by a programmable processor; and method steps according to embodiments of the invention can be performed by a programmable processor executing a program of instructions to perform functions of the invention by operating on input data and generating output. Embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention claimed is:

1. A method of processing a paging message, the method being suitable for a User Equipment for a wireless telecommunication system, and comprising the steps of:
   monitoring a Paging Indicator included in a Paging Indicator Channel message
   upon reception of a Paging Indicator relevant to said User Equipment, detecting and decoding a paging channel in order to decode a corresponding paging message;
   computing and checking the CRC of said paging message and, in case of failure of the CRC check, performing the following steps:
   performing a partial checking of said paging message, said partial checking being limited to a number of fields of said paging message;
   determining whether said paging message is relevant to one single UE;
   when said paging message is relevant to one single UE, replacing the bits not relevant to said single UE by default bits and computing and checking a new CRC; and
   when the new CRC check succeeds, forwarding the processed paging message to the Radio Resources Control layer.

2. The method according to claim 1 wherein said partial checking comprises a checking of a header of the paging message.

3. The method according to claim 1 wherein said partial checking comprises the checking of one or more of the following fields of the paging message:
   "Paging type 1=0" (1 bit),
   "Paging Record List present=1" (1 bit),
   "cn-Identity=σ' (1 bit),
   "Number of paging record=000 or 001 or 010",
   "laterNonCriticalExtensions=0").

4. Process according to claim 2, wherein it further comprises the checking of the presence of data on the broadcast information.

5. Process according to claim 4, wherein said paging message is discarded in the case of no broadcast information.

6. Process according to claim 1, wherein said paging message is discarded in the case where said paging message is relevant to a number of UEs superior to 1.

7. Process according to claim 1, wherein a Paging header is being checked when said paging message is relevant to a number of UEs superior to 1.

8. Process according to claim 7, wherein it includes the step of replacing the bits not relevant to said single UE by default bits in the case where the paging header is correct.

9. Receiver suitable for a User Equipment for a wireless telecommunication system, adapted to process a paging message, said receiver comprising:
   a monitor adapted to monitor a Paging Indicator included in a Paging Indicator Channel message;
   a detector and a decoder, respectively adapted to detect and decode the PCH channel in order to decode a corresponding paging message upon reception of a Paging Indicator relevant to said User Equipment;
   a processor adapted to compute and check the CRC of said paging message,
   and further adapted to perform a partial checking of said paging message in case of failure of the CRC check, said partial checking being limited to a number of fields of said paging message;
   a determination unit adapted to determine whether said paging message is relevant to one single UE;
   wherein said processor is adapted to replace the bits not relevant to said single UE by default bits and compute and check a new CRC, if said paging message is relevant to one single UE; and
   forward the processed paging message to the Radio Resources Control layer if the CRC check succeeds.

10. The receiver according to claim 9 wherein said processor adapted to perform a partial checking is adapted to perform a checking of a header of the paging message.

11. Receiver according to claim 9, wherein said processor adapted to perform a partial checking is adapted to perform a checking of one or more of the following fields of the paging message:
   "Paging type 1=0" (1 bit),
   "Paging Record List present=1" (1 bit),
   "en-Identity=0" (1 bit),
   "Number of paging record=000 or 001 or 010",
   "laterNonChticalExtensions=0").

12. Receiver according to claim 10, wherein it further comprises means for checking of the presence of data on the broadcast information.

13. A wireless communication device comprising a receiver as defined claim 9.

14. The wireless communication device of claim 13, wherein the wireless communication device is a UMTS mobile telephone.

15. A computer program product comprising a non-transitory computer readable medium, having thereon a computer program comprising program instructions, the computer program being loadable into a data-processing unit and adapted to cause the data-processing unit to execute the method according to claim 1 when the computer program is run by the data-processing unit.

* * * * *